US008687510B1

(12) United States Patent
Shirali et al.

(10) Patent No.: US 8,687,510 B1
(45) Date of Patent: *Apr. 1, 2014

(54) ADAPTIVELY DETERMINING A DATA RATE OF PACKETIZED INFORMATION TRANSMISSION OVER A WIRELESS CHANNEL

(75) Inventors: Kedar Shirali, Sunnyvale, CA (US); Ravi Narasimhan, Los Altos, CA (US); Yungping Hsu, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 408 days.

This patent is subject to a terminal disclaimer.

(21) Appl. No.: 12/750,531

(22) Filed: Mar. 30, 2010

Related U.S. Application Data

(63) Continuation of application No. 10/988,318, filed on Nov. 12, 2004, now Pat. No. 7,697,449.

(60) Provisional application No. 60/590,138, filed on Jul. 21, 2004, provisional application No. 60/590,042, filed on Jul. 20, 2004.

(51) Int. Cl.
*G01R 31/08* (2006.01)

(52) U.S. Cl.
USPC ............................................ 370/252; 370/328

(58) Field of Classification Search
USPC .......... 370/203, 208, 252, 328, 335, 338, 465
See application file for complete search history.

(56) References Cited

U.S. PATENT DOCUMENTS

| 4,989,201 | A | * | 1/1991 | Glance ............................. 398/95 |
| 5,345,599 | A | | 9/1994 | Paulraj et al. |
| 5,483,676 | A | | 1/1996 | Mahany et al. |
| 5,912,931 | A | * | 6/1999 | Matsumoto et al. .......... 375/340 |
| 6,118,565 | A | * | 9/2000 | Frigo .............................. 398/68 |
| 6,351,499 | B1 | | 2/2002 | Paulraj et al. |
| 6,377,636 | B1 | | 4/2002 | Paulraj et al. |
| 6,452,981 | B1 | | 9/2002 | Raleigh et al. |

(Continued)

FOREIGN PATENT DOCUMENTS

WO  WO 03/001726  1/2003

OTHER PUBLICATIONS

Catreux, et al., "Adaptive Modulation and MIMO Coding for Broadband Wireless Data Networks", Jun. 2002, IEEE Communications Magazine, pp. 108-115.

Foschini, et al., "On Limits of Wireless Communications in a Fading Environment when Using Multiple Antennas", 1998, Wireless Personal Communications, pp. 311-335.

Goldsmith, et al., "Adaptive Coded Modulation for Fading Channels", May 1998, IEEE Transactions on Communications, vol. 46, No. 5, pp. 595-602.

(Continued)

*Primary Examiner* — Ricky Ngo
*Assistant Examiner* — Christine Ng

(57) ABSTRACT

Systems and techniques relating to processing a signal received over a wireless channel. A technique includes adaptively determining a data rate of packetized information transmission based on both a signal quality measure of a received signal and a channel quality measure derived from the received signal, the channel quality measure being indicative of frequency selectivity in the wireless channel. An apparatus includes a channel estimator configured to be responsive to a received OFDM signal corresponding to multiple frequency tones of the channel, and configured to evaluate channel response characteristics of the frequency tones; and a channel state indicator configured to generate a channel quality measure usable along with a signal quality measure in adaptively determining a data rate of packetized information transmission, wherein the channel quality measure is generated from the channel response characteristics of the frequency tones and is indicative of frequency selectivity in the wireless channel.

22 Claims, 3 Drawing Sheets

(56) References Cited

U.S. PATENT DOCUMENTS

| | | | |
|---|---|---|---|
| 6,499,008 | B2 | 12/2002 | Miet |
| 6,618,591 | B1 | 9/2003 | Kalliokulju et al. |
| 6,633,616 | B2 | 10/2003 | Crawford |
| 6,643,496 | B1 | 11/2003 | Shimoyama et al. |
| 6,675,012 | B2 | 1/2004 | Gray |
| 6,687,492 | B1 | 2/2004 | Sugar et al. |
| 6,775,548 | B1 | 8/2004 | Rong et al. |
| 6,801,501 | B1 | 10/2004 | Knightly et al. |
| 6,801,580 | B2 * | 10/2004 | Kadous ............... 375/267 |
| 6,826,528 | B1 * | 11/2004 | Wu et al. ............... 704/226 |
| 6,889,050 | B1 | 5/2005 | Willars et al. |
| 6,987,819 | B2 * | 1/2006 | Thomas et al. ............... 375/342 |
| 7,032,157 | B2 | 4/2006 | Kim et al. |
| 7,046,963 | B2 | 5/2006 | Luo et al. |
| 7,075,913 | B1 | 7/2006 | Yavuz et al. |
| 7,164,655 | B2 | 1/2007 | Li |
| 7,302,009 | B2 * | 11/2007 | Walton et al. ............... 375/267 |
| 7,408,976 | B1 | 8/2008 | Narasimhan et al. |
| 7,532,563 | B1 | 5/2009 | Shirali et al. |
| 7,590,188 | B2 * | 9/2009 | Giannakis et al. ............... 375/295 |
| 7,640,373 | B2 * | 12/2009 | Cudak et al. ............... 710/19 |
| 7,672,685 | B2 | 3/2010 | Itoh |
| 7,697,449 | B1 * | 4/2010 | Shirali et al. ............... 370/252 |
| 7,864,661 | B2 * | 1/2011 | Hosur et al. ............... 370/210 |
| 7,864,678 | B1 | 1/2011 | Sampath et al. |
| 8,149,810 | B1 | 4/2012 | Narasimhan et al. |
| 2001/0055276 | A1 | 12/2001 | Rogers et al. |
| 2002/0056066 | A1 | 5/2002 | Gesbert et al. |
| 2002/0141349 | A1 | 10/2002 | Kim et al. |
| 2002/0183010 | A1 | 12/2002 | Catreux et al. |
| 2002/0196842 | A1 | 12/2002 | Onggosanusi et al. |
| 2003/0003863 | A1 | 1/2003 | Thielecke et al. |
| 2003/0065712 | A1 | 4/2003 | Cheung et al. |
| 2003/0083088 | A1 | 5/2003 | Chang et al. |
| 2003/0086486 | A1 * | 5/2003 | Graziano et al. ............... 375/222 |
| 2003/0100265 | A1 | 5/2003 | Wang et al. |
| 2003/0231655 | A1 * | 12/2003 | Kelton et al. ............... 370/468 |
| 2004/0017773 | A1 | 1/2004 | Piche et al. |
| 2004/0017790 | A1 | 1/2004 | Del Prado et al. |
| 2004/0082356 | A1 | 4/2004 | Walton et al. |
| 2004/0153951 | A1 | 8/2004 | Walker et al. |
| 2004/0160922 | A1 | 8/2004 | Nanda et al. |
| 2004/0160979 | A1 | 8/2004 | Pepin et al. |
| 2004/0203456 | A1 | 10/2004 | Onggosanusi et al. |
| 2005/0027840 | A1 | 2/2005 | Theobold et al. |
| 2005/0099975 | A1 | 5/2005 | Catreux et al. |
| 2005/0117543 | A1 | 6/2005 | Heath et al. |
| 2005/0143027 | A1 * | 6/2005 | Hiddink et al. ............... 455/127.1 |
| 2005/0249157 | A1 * | 11/2005 | Qian et al. ............... 370/329 |
| 2005/0254592 | A1 * | 11/2005 | Naguib et al. ............... 375/267 |
| 2011/0149723 | A1 | 6/2011 | Gong et al. |

OTHER PUBLICATIONS

Hayes, et al., "Part 11: Wireless LAN Medium Access Control (MAC) and Physical Layer (PHY) specifications", International Standard, ISO/IEC 8802-11, ANSI/IEEE Std. 802.11, pp. i-xvi, pp. 1-512, 1999.

Hayes, et al., "Part 11: Wireless LAN Medium Access Control (MAC) and Physical Layer (PHY) specifications: High-speed Physical Layer in the 5 GHZ Band", IEEE, Supplement to IEEE Standard for Information Technology, Std. 802.11a, pp. i-viii, pp. 1-83, 1999.

IEEE Computer Society, "Draft 802.20 Permanent Document : System Requirements for IEEE 802.20 Mobile Broadband Wireless Access Systems—Version 14", IEEE 802.20-PD-06, Jul. 2004.

IEEE Computer Society, "IEEE Standard for Information Technology—Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band", IEEE P802.11g/D8.2, Apr. 2003.

IEEE Computer Society, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 5: Spectrum and Transmit Power Management Extensions in the 5 GHz Band in Europe", IEEE P802.11h—2003.

IEEE Computer Society, "Part 16: Air Interface for Fixed Broadband Wireless Access Systems", IEEE Std 802.16-2004.

IEEE Computer Society, "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 GHZ Band", IEEE Std 802.11b—1999.

IEEE Computer Society, "TGn Sync Proposal Technical Specification", IEEE Std 802.11n—First Edition, May 2005.

Narasimhan et al., U.S. Appl. No. 10/620,024, filed Jul. 14, 2003.

Sampath et al., U.S. Appl. No. 10/734,440, filed Dec. 11, 2003.

Sampath, et al. U.S. Appl. No. 10/834,745, filed Apr. 28, 2004.

Shirali et al., U.S. Appl. No. 10/988,318, filed Nov. 12, 2004.

Tarokh, et al., "Space-Time Block Codes from Orthogonal Designs", Jul. 1999, IEEE Transactions on Information Theory, vol. 45, No. 5, pp. 1456-1467.

Xin, et al., "Space-Time Constellation-Rotating Codes Maximizing Diversity and Coding Gains", 2001, IEEE, pp. 455-459.

* cited by examiner

ADAPTIVELY DETERMINING A DATA RATE OF PACKETIZED INFORMATION TRANSMISSION OVER A WIRELESS CHANNEL

CROSS REFERENCE TO RELATED APPLICATIONS

This application is a continuation of and claims the benefit of the priority of U.S. application Ser. No. 10/988,318 filed Nov. 12, 2004 and entitled "ADAPTIVELY DETERMINING A DATA RATE OF PACKETIZED INFORMATION TRANSMISSION OVER A WIRELESS CHANNEL", which claims the benefit of the priority of: (1) U.S. Provisional Application Ser. No. 60/590,042, filed Jul. 20, 2004 and entitled "A Mechanism to Predict the Physical Layer Transmission Parameters for Use in Current and Future Generations of Wireless LANs"; and (2) U.S. Provisional Application Ser. No. 60/590,138, filed Jul. 21, 2004 and entitled "A Mechanism to Predict the Physical Layer Transmission Parameters for Use in Current and Future Generations of Wireless LANs," all of which are hereby incorporated by reference.

This application is related to U.S. patent application Ser. No. 10/799,548, filed Mar. 11, 2004 and entitled "A MECHANISM TO IMPROVE QUALITY OF CHANNEL ESTIMATES IN OFDM TRANSMISSIONS", U.S. patent application Ser. No. 10/834,745, filed Apr. 28, 2004 and entitled "A METHOD TO MITIGATE INTERCARRIER INTERFERENCE (ICI) IN OFDM SYSTEMS FOR HIGH DATA RATE TRANSMISSIONS", and U.S. patent application Ser. No. 10/912,829, filed Aug. 5, 2004 and entitled "MIMO-OFDM RECEIVER PROCESSING", all of which are hereby incorporated by reference.

TECHNICAL FIELD

The present disclosure describes systems and techniques relating to processing a signal received over a wireless channel, for example, deriving a channel quality measure from an orthogonal frequency division multiplexed (OFDM) signal to aid in adaptively determining a data rate of packetized information transmission over a wireless channel.

BACKGROUND

Mobile phones, laptops, personal digital assistants (PDAs), base stations and other systems and devices can wirelessly transmit and receive data. Such systems and devices have used orthogonal frequency division multiplexing (OFDM) transmission schemes, such as those defined in the Institute of Electrical and Electronics Engineers (IEEE) 802 wireless communications standards. The IEEE 802 standards include IEEE 802.11, 802.11a, 802.11b, 802.11g, 802.11n, 802.16, and 802.20. In an OFDM system, in particular, a data stream is split into multiple substreams, each of which is sent over a different subcarrier frequency (also referred to as a tone or frequency tone).

Some wireless communication systems use a single-in-single-out (SISO) transmission approach, where both the transmitter and the receiver use a single antenna. Other wireless communication systems use a multiple-in-multiple-out (MIMO) transmission approach, where multiple transmit antennas and multiple receive antennas to improve data rates and/or link quality. OFDM systems can be implemented as SISO or MIMO communication systems and can provide various advantages, including a relatively simple receiver architecture and potential performance improvements through appropriate coding across OFDM tones.

Despite these advantages, OFDM transmissions, like other wireless transmissions, are susceptible to various signal degrading effects, including fading and multipath effects. The efficiency of transmission over wireless channels, in general, is strongly dependent upon the transmitter's ability to exploit the wireless channel's characteristics. This can be in the form of information-theory based strategies to achieve near-capacity transmission rates or strategies that exploit some coarse measure of the channel properties to select some transmission parameters like modulation formats and code rates to increase the probability of a successful transmission. For example, in Automatic Repeat-reQuest (ARQ) based packet transmission systems, where a packet error results in the need to retransmit the same information until it is correctly received by the receiving device, the data rate for transmission is typically selected based on a signal quality measure (e.g., a received signal strength indication (RSSI)) and a retry rate.

SUMMARY

The present disclosure includes systems and techniques relating to processing a signal received over a wireless channel. According to an aspect of the described systems and techniques, a data rate of packetized information transmission over a wireless channel is adaptively determined based on both a signal quality measure of a received signal and a channel quality measure derived from the received signal, the channel quality measure being indicative of frequency selectivity in the wireless channel. Adaptively determining the data rate can involve using the signal quality measure as a first level determinant of the data rate, and using the channel quality measure as a second level determinant of the data rate. Moreover, the wireless channel can be a radio frequency channel, and the received signal can include an orthogonal frequency division multiplexed (OFDM) signal corresponding to multiple frequency tones that make up the radio frequency channel; and the technique can include estimating channel response characteristics of the frequency tones, and deriving the channel quality measure from the estimated channel response characteristics of the frequency tones.

According to another aspect, an apparatus includes a channel estimator configured to be responsive to a received OFDM signal corresponding to multiple frequency tones of a wireless channel, and configured to evaluate channel response characteristics of the frequency tones; and a channel state indicator responsive to output of the channel estimator and configured to generate a channel quality measure usable along with a signal quality measure in adaptively determining a data rate of packetized information transmission over the wireless channel, wherein the channel quality measure is generated from the channel response characteristics of the frequency tones and is indicative of frequency selectivity in the wireless channel.

The apparatus can include a rate controller that adaptively determines the data rate using the signal quality measure as a first level determinant of the data rate and using the channel quality measure as a second level determinant of the data rate. Additionally, the apparatus can include a transmit section compliant with a wireless communication standard selected from the group consisting of IEEE 802.11, 802.11a, 802.11b, 802.11g, 802.11n, 802.16, and 802.20.

The described systems and techniques can result in increased throughput from reduced transmission errors and thus reduced retransmissions of the same information. A transmitter can adaptively determine a maximum transmission rate with acceptable probability of packet error, and the probability of successful transmission on the first attempt can be improved without starting at an unnecessarily low data rate. This can result in improved rate adaptation mechanisms.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Figure 1:
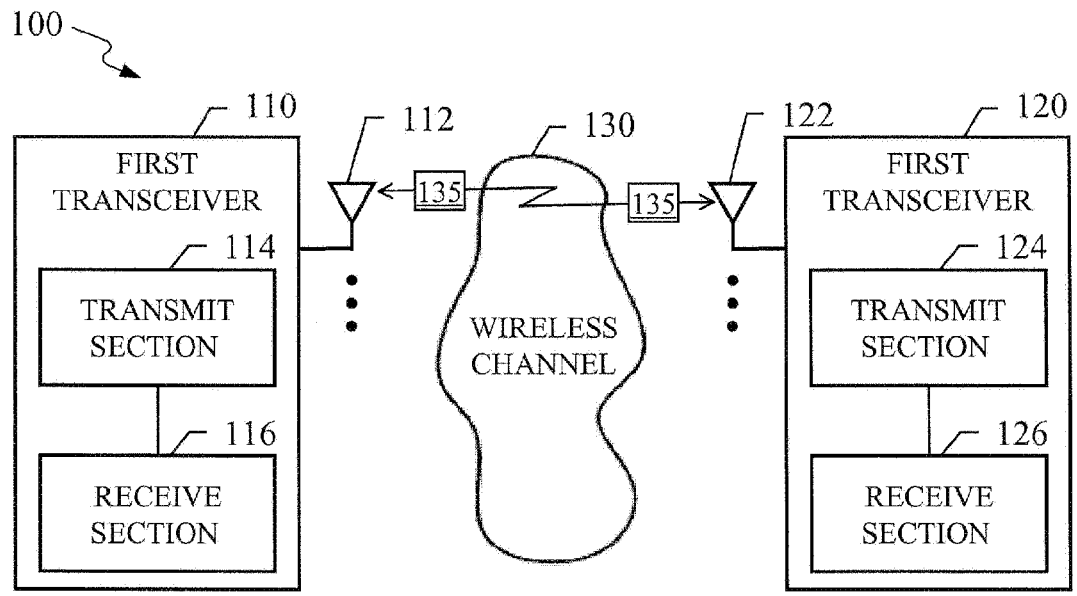
FIG. 1 is a block diagram of a communication system that adaptively determines a data rate of packetized information transmission over a wireless channel based on both a signal quality measure of a received signal and a channel quality measure derived from the received signal.

FIG. 1 is a block diagram of a communication system 100 that adaptively determines a data rate of packetized information transmission over a wireless channel 130 based on both a signal quality measure of a received signal and a channel quality measure derived from the received signal. The system 100 adapts to changes in the wireless channel 130 and adjusts the transmission data rate accordingly. The communication system 100 can be a single-in-single-out (SISO) system or a multiple-in-multiple-out (MIMO) system. Thus, a first transceiver 110 can have one or more antennas 112, and a second transceiver 120 can have one or more antennas 122.

Additionally, the transceiver 110 includes a transmit section 114 and a receive section 116, and the transceiver 120 includes a transmit section 124 and a receive section 126. The transceivers 110, 120 are sometimes referred to as transmitters and receivers for convenience, with the understanding that the systems and techniques described are applicable to wireless systems that use dedicated transmitters and receivers as well as transceivers generally.

The packetized information transmission involves the transmission of information over the wireless channel 130 in the form of discrete sections of information 135, often referred to as packets or frames. The system 100 can employ an Automatic Repeat-reQuest (ARQ) protocol. The wireless channel 130 can be a radio frequency channel, and the transmissions over the wireless channel 130 can be orthogonal frequency division multiplexed (OFDM) signals. The transceivers 110, 120 can be implemented in a wireless local area network (WLAN) that complies with one or more of the IEEE 802 wireless standards (including IEEE 802.11, 802.11a, 802.11b, 802.11g, 802.11n, 802.16, and 802.20).

In general, wireless channels are typically affected by two dominant phenomena (among others) known as fading and multipath effects. These two effects are typically random and time varying, and determine the receiver-signal-to-noise ratio (Rx-SNR). Signal processing techniques for recovering transmitted signals in light of these effects are well known. For example, in 802.11a/g wireless systems, the OFDM modulation mechanism is used, and predefined training symbols are included in the preambles of data frames for use in estimating characteristics of the wireless channel in order to equalize the channel.

In an OFDM modulation approach, the channel bandwidth is divided into narrow slices called tones, and quadrature-amplitude modulated (QAM) symbols are transmitted over the tones. A defined structure to a SISO-OFDM transmitted signal enables the received signal on a tone, $Y_k$, where k is the tone index, to be written as:

$$Y_k = H_k X_k + N_k \quad (1)$$

where $H_k$ is the complex valued channel gain, $X_k$ is the QAM symbol transmitted over the tone, and $N_k$ is the frequency domain additive Gaussian distributed white noise. Thus, an estimate of the channel gain at tone k can be obtained at the receiver by dividing $Y_k$ by $X_k$ in the training sequence portion of the received signal.

In addition to the SNR, the channel profile (i.e., the values of the $H_k$'s) also plays an important role in the capacity of the wireless channel. To account for this, the system 100 uses a channel quality measure that is indicative of frequency selectivity in the wireless channel.

Figure 2:
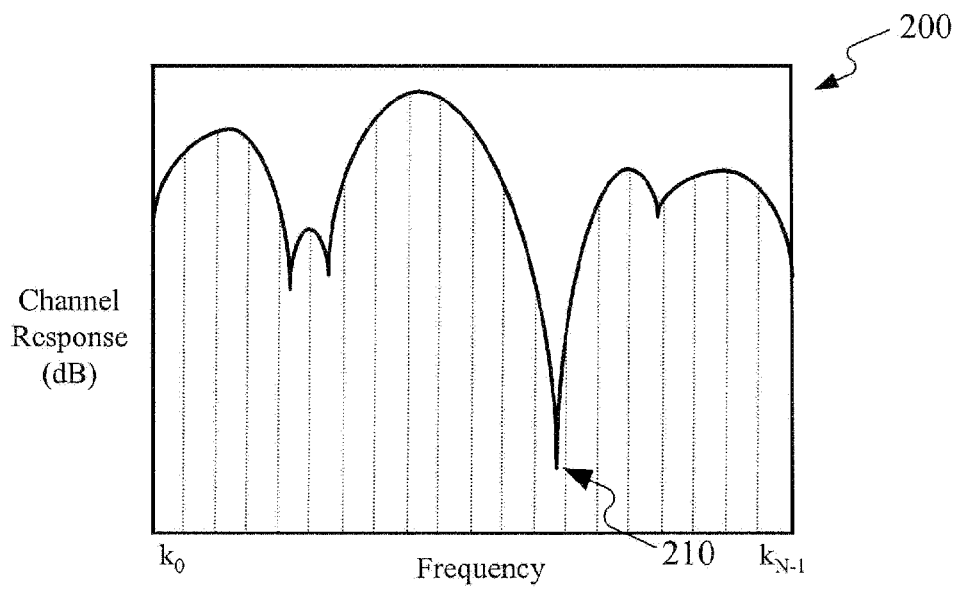
FIG. 2 illustrates an example of channel response in a OFDM-SISO wireless communications system.

FIG. 2 illustrates an example of channel response in a SISO-OFDM wireless communications system. A graph 200 plots frequency versus the magnitude of the frequency response of the channel (in decibels (dB)). This represents the channel response at a particular point in time. As shown, the wireless channel exhibits multipath fading that can result in multiple notches in the channel, including potentially very serious notches, such as a frequency notch 210.

In an OFDM system, the data stream is split into multiple substreams, each of which is sent over a different subcarrier frequency (frequency tone). In FIG. 2, the tones are designated by divisions of the channel across the full frequency range shown, and the tones are referenced by $k_0$ to $k_{N-1}$, where N is the number of tones used. Despite this illustration, it should nonetheless be appreciated that the systems and techniques described here can be applied across all sub-bands of the full channel band or across some subset of the sub-bands; for example, in IEEE 802.11a systems, OFDM symbols can include 64 tones (with 48 active tones) indexed as $\{-32, -31, \ldots, -1, 0, 1, \ldots, 30, 31\}$, where 0 is the index of a tone that is not used to transmit information.

Measuring the channel gain at the midpoint of tone k, gives a signal-to-noise (SNR) ratio for tone k as follows:

$$SNR_k = \left(\frac{\sigma_x^2}{\sigma_n^2}\right) |H_k|^2 \quad (2)$$

where $\sigma_x^2$ is the variance in signal energy (variance of the transmitted QAM signals), and $\sigma_n^2$ is the noise variance (variance in additive, white Gaussian-distributed noise). Due to multipathing and fading, the channel can have notches (very small values of $|H_k|^2$) in the channel that can seriously degrade the performance of the system. By taking the nature of these notches in the channel into consideration during setting of the data rate for transmission over the wireless channel, system performance can be improved. Thus, a channel quality measure that is indicative of frequency selectivity in the wireless channel, as the wireless channel changes over time, is used in the adaptive determination of the data rate.

A measure of the SNR average across all the tones is a general measure of the ability of the wireless channel to support a certain data rate. Moreover, the geometric mean of the SNRs across all the OFDM tones is generally indicative of frequency selectivity in the wireless channel. Thus, the channel quality measure used can be the geometric mean as given by:

$$\text{GeomSNR} = (\Pi_k \text{SNR}_k)^{1/N} \quad (3)$$

where N is the number of tones and $\Pi$ is the product operation. When expressed in the dB scale:

$$\text{GeomSNR}_{dB} = (10/N) \sum_k \log_{10}(\text{SNR}_k) = \quad (4)$$

$$\left\{ (10/N) \sum_k \log_{10}(|H_k|^2) \right\} + \left\{ 10 \log_{10}\left(\frac{\sigma_x^2}{\sigma_n^2}\right) \right\}$$

The geometric SNR has been found to be strongly indicative of the capacity of the channel. An alternative channel quality measure is to extract only the channel component of the geometric SNR (treating the second term above, $\{10 \log_{10}(\sigma_x^2/\sigma_n^2)\}$, as a constant bias that can be disregarded), thus resulting in a frequency selectivity measure (FSM) in a SISO system as follows:

$$\text{FSM}_{SISO-dB} = (10/N) \Sigma_k \log_{10}(|H_k|^2) \quad (5)$$

Simulations of a wireless communication system have shown that this channel quality measure is a good indication of the geometric SNR and the capacity of the wireless channel, and can be reliably used for rate selection.

Figure 3:
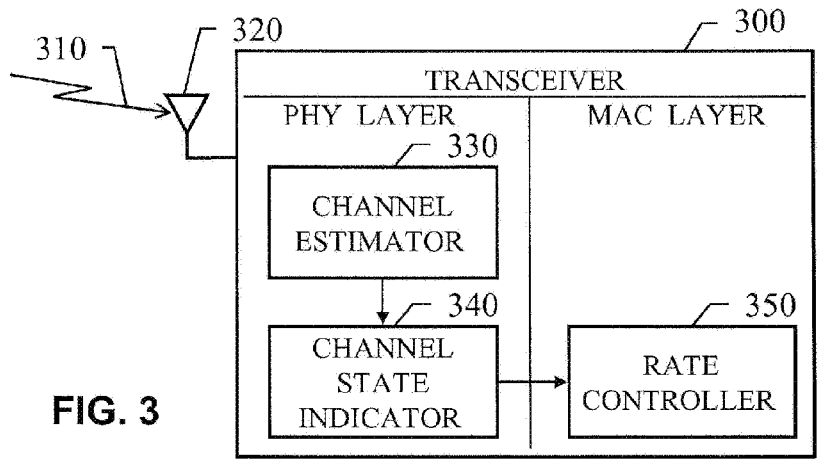
FIG. 3 is a block diagram of an example transceiver that adaptively determines the transmission data rate based on both a signal quality measure of a received signal and a channel quality measure derived from the received signal.

FIG. 3 is a block diagram of an example transceiver 300 that adaptively determines the transmission data rate based on both a signal quality measure of a received signal 310 and a channel quality measure derived from the received signal 310. The transceiver 300 includes a physical (PHY) layer and a media access control (MAC) layer. The MAC and PHY components can be integrated into a single device or constructed in separate devices, which can then be operationally connected to form the transceiver 300.

A channel estimator 330 is configured to be responsive to the signal 310 received over a wireless channel through an antenna 320. The received signal 310 can be an OFDM signal corresponding to multiple frequency tones of the wireless channel, and the channel estimator 330 can also be configured to evaluate channel response characteristics of the frequency tones, such as from predefined training symbols in the received signal 310.

A channel state indicator 340 is responsive to output of the channel estimator 330 and can be configured to generate a channel quality measure from the channel response characteristics of the frequency tones, where the channel quality measure is indicative of frequency selectivity in the wireless channel. The channel quality measure can be a geometric mean of SNRs across the frequency tones or, specifically, a frequency selectivity measure, as described above. Moreover, the channel estimator 330 and the channel state indicator 340 can be integrated into the PHY as shown or can be constructed in a separate device that is configured to be operationally connected with the PHY.

The channel quality measure can be used along with a signal quality measure in adaptively determining a data rate of packetized information transmission over the wireless channel. The MAC can include a rate controller 350 that adaptively determines the data rate using the signal quality measure as a first level determinant of the data rate and using the channel quality measure as a second level determinant of the data rate. For example, the rate controller 350 can select an original rate based on the signal quality measure and one or more signal quality thresholds, and the rate controller 350 can then adjust the original rate if the signal quality measure falls within a tolerance range of a signal quality threshold and if the channel quality measure indicates an adjustment is needed.

It is to be appreciated that various divisions of processing tasks into components and various placements of components in the transceiver 300 are possible. In general though, the channel quality measurement can be implemented in the PHY, and the usage of that information (e.g., for determining desired datarate) can be implemented in the PHY or the MAC as desired.

Figure 4:
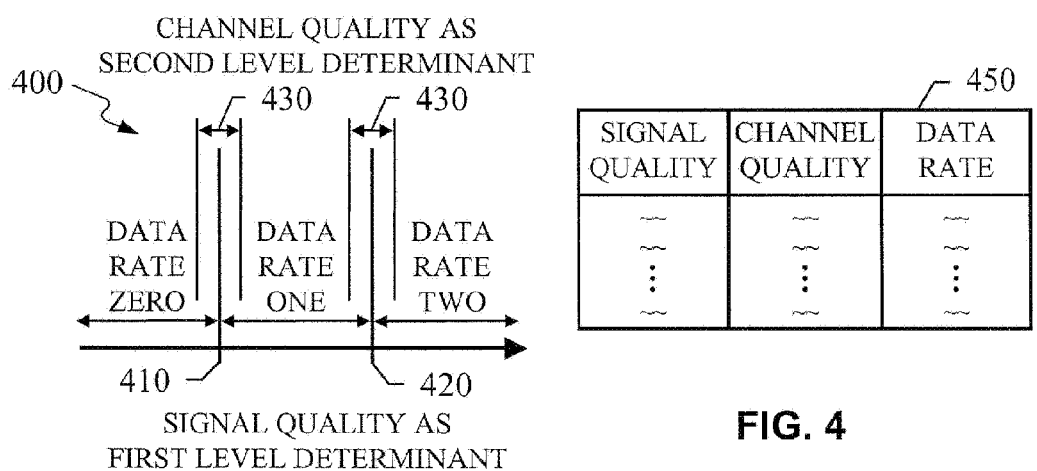
FIG. 4 illustrates adaptive rate determination using the signal quality measure as a first level determinant of the data rate and using the channel quality measure as a second level determinant of the data rate.

FIG. 4 illustrates adaptive rate determination 400 using the signal quality measure as a first level determinant of the data rate and using the channel quality measure as a second level determinant of the data rate. The signal quality measure can be one or more indications of signal quality generally, such as an overall SNR for the received signal or an RSSI. In the example shown, the signal quality measure is compared with two signal quality thresholds 410, 420 to select a data rate from three possible data rates: zero, one, and two. Thus, when the signal quality measure is in a first range, data rate zero is selected; when the signal quality measure is in a second range, data rate one is selected; and when the signal quality measure is in a third range, data rate two is selected.

However, this original selection is only a provisional selection, since the signal quality measure likely includes uncertainty that causes the rate determination to be potentially sub-optimal when the signal quality measure falls within a tolerance range 430. When the signal quality measure falls within the tolerance range 430 of one of the thresholds 410 and 420, then the channel quality measure is used as a second level determinant of the data rate.

The channel quality measure serves as a check on the accuracy of the signal quality measure and can thus be used to adjust the data rate determined originally based on the signal quality measure. This adjustment can be designed to go in both directions (e.g., decrease an original rate when the channel quality measure falls below a threshold and increase an original rate when the channel quality measure falls above a threshold), or this adjustment can be designed to go in only one direction (e.g., decrease an original rate when the channel quality measure falls below a channel quality threshold). The later case can be illustrated in FIG. 4 by moving the signal quality thresholds 410, 420 to the left until they line up with the lower values of the tolerance ranges 430 (i.e., the signal quality threshold can be set such that falling below the threshold specifies a certain data rate, but falling above the threshold by only a little results in the channel quality measure being taken into consideration).

The available data rates can be many more than three data rates, and the selection of a data rate can be performed using a lookup table 450, which includes columns for signal quality values, channel quality values, and the corresponding data rates to choose. For example, the following sequence logic can be employed in various wireless systems, including an 802.11g wireless system, to use the channel quality measure defined in equation (5) to pick the PHY layer data rate that can be reliably transmitted (i.e., at an acceptable packet error rate):

1. Read the RSSI; based on the RSSI value, read the RSSI→PHY data rate lookup table to determine the data rate R (the lookup table can be interpreted as "pick data rate R if RSSI>δ(R)").
2. If |RSSI−δ(R)|<ε AND $FSM_{SISO\text{-}dB}$>t, then pick R corresponding to the condition RSSI>δ(R), else pick the next lower rate.

The lookup table 450 can be included in the MAC in the transceiver, and the signal quality measure can be an RSSI that is a direct current (DC) measure of radio frequency (RF) signal strength at an input to an intermediate frequency (IF) amplification stage of the transceiver.

In general, when confidence can be placed solely in the signal quality measure, this value is used to determine the data rate, and otherwise, both the signal quality measure and the channel quality measure are used to determine the data rate. This approach to choosing a data rate can improve the probability of successful packet transmission on the first attempt, and can improve throughput by reducing the probability of retries. Simulations run using the above sequence logic in an 802.11g wireless system have shown considerable improvements in performance, with throughput increasing by as much as 2-3 megabits per second (Mbps), which may be a conservative estimate as the simulations showed a significant drop in packet error events.

Figure 5:
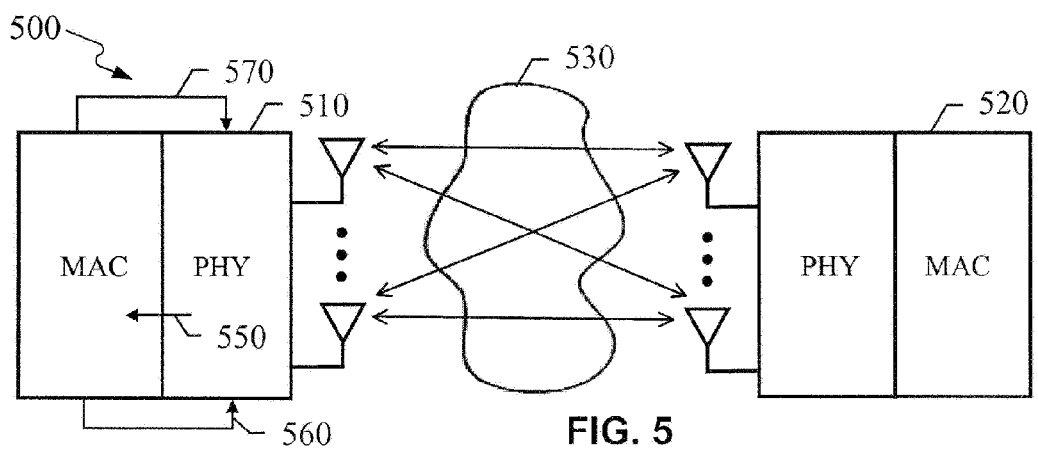
FIG. 5 is a block diagram of example transceivers in a MIMO-OFDM wireless communications system.

The channel quality measures described above for SISO can be generalized to MIMO devices, which operate using $M_t$ transmit antennas and $M_r$ receive antennas. FIG. 5 is a block diagram of example transceivers 510, 520 in a MIMO-OFDM wireless communications system 500. The PHY in the transceiver 510 provides quality measures 550 to the MAC, which in turn provides transmission parameters 560 and data 570 to the PHY.

In a MIMO system, data is transmitted over a wireless channel 530 through multiple antennas. While in SISO-OFDM based systems, the wireless channel 530 manifests in the frequency domain as a complex gain factor $H_k$, in MIMO-OFDM based systems, the wireless channel 530 manifests as a matrix $H_k$ of dimension $M_t \times M_r$ whose elements are complex numbers. Such a system is capable of simultaneously supporting a transmission of a maximum $M_t$ independent data streams.

A measure analogous to the frequency selectivity measure used in SISO systems can be derived for MIMO systems as well. For every tone k, a measure called reciprocal noise enhancement factor (RNEF) can be defined as follows:

$$\text{RNEF}_{n,k}=1/([H_k^{Hm}H_k]^{-1})_{n,n} \quad (6)$$

where n is the spatial index, the superscript Hm stands for the Hermitian operation on matrix $H_k$, and $A_{n,n}$ corresponds to an nth diagonal element of any square matrix A.

The frequency selectivity measure can then be written as:

$$\text{FSM}_{MIMO}=[\varnothing_{n,k}(\text{RNEF}_{n,k})]^{(1/nk)} \quad (7)$$

where $\Pi_{n,k}$ is the product taken over spatial-frequency dimensions. When expressed in decibels, this can be written as:

$$\text{FSM}_{MIMO\text{-}dB}=(10/nk)\Sigma_{n,k}\log_{10}(1/([H_k^{Hm}H_k]^{-1})_{n,n}) \quad (8)$$

The $\text{FSM}_{MIMO\text{-}dB}$ measure can be used in the same way as the $\text{FSM}_{SISO\text{-}dB}$ measure, and thus similar system components can be used to generate the channel quality measure in a MIMO-OFDM wireless communication system. Additionally, the signal quality measure can be obtained in a MIMO-OFDM wireless communication system using known methods.

In both a MIMO-OFDM system and a SISO-OFDM system, the details involved in determining the signal quality measure and the channel quality measure should include variations as appropriate for the specific system, as will be understood by those skilled in the art, but the overall process of determining the data rate based on these quality measures remains generally the same in both MIMO and SISO systems.

Figure 6:
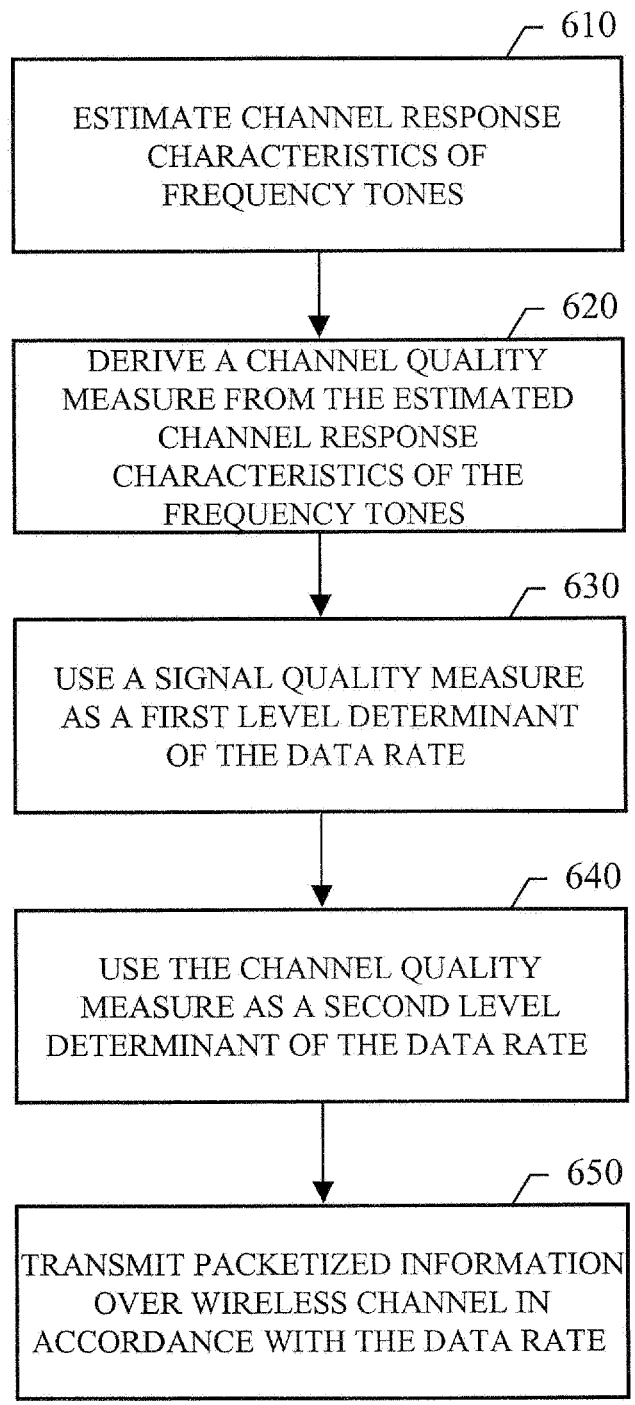
FIG. 6 is a flowchart illustrating an example process communicating packetized information over a radio frequency channel in an OFDM wireless communication system.

FIG. 6 is a flowchart illustrating an example process of communicating packetized information over a radio frequency channel in an OFDM wireless communication system. This process, and all of the functional operations described in this specification, can be implemented in electronic circuitry, or in computer hardware, firmware, software, or in combinations of them, such as the structural means disclosed in this specification and structural equivalents thereof, including potentially a software program operable to cause one or more machines to perform the operations described. It will be appreciated that the order of operations presented is shown only for the purpose of clarity in this description. No particular order is required for these operations, and some or all of the operations may occur simultaneously in various implementations.

Channel response characteristics of the frequency tones are estimated at 610. This estimation can be performed using predefined training symbols in a received signal, such as those used in 802.11 wireless systems. A channel quality measure, such as described above, is derived from the estimated channel response characteristics of the frequency tones at 620.

A signal quality measure, such as described above, is used as a first level determinant of the data rate at 630. This can involve selecting an original rate based on a received signal strength indication. The channel quality measure is used as a second level determinant of the data rate at 640. This can involve comparing the signal quality measure with a value indicating a range of tolerance, and comparing the channel quality measure with a channel quality threshold when the signal quality measure falls within the tolerance range (this can also be thought of as an uncertainty range, in that there is uncertainty as to whether the selected original data rate is appropriate when the signal quality measure falls within this range).

The packetized information is transmitted over the wireless channel in accordance with the determined data rate at 650. This transmission can be performed in a manner appropriate for the type of OFDM system employed.

A few embodiments have been described in detail above, and various modifications are possible. For example, the present systems and techniques may be combined with one or more of the systems and techniques described in U.S. patent application Ser. No. 10/799,548, filed Mar. 11, 2004 and entitled "A MECHANISM TO IMPROVE QUALITY OF CHANNEL ESTIMATES IN OFDM TRANSMISSIONS", U.S. patent application Ser. No. 10/834,745, filed Apr. 28, 2004 and entitled "A METHOD TO MITIGATE INTER-CARRIER INTERFERENCE (ICI) IN OFDM SYSTEMS FOR HIGH DATA RATE TRANSMISSIONS", and U.S. patent application Ser. No. 10/912,829, filed Aug. 5, 2004 and entitled "MIMO-OFDM RECEIVER PROCESSING".

Other embodiments fall within the scope of the following claims.

What is claimed is:

1. A method comprising:
   determining a data rate of information transmission over a wireless channel based on two or more measures derived from a received signal, wherein the two or more measures comprise a first measure that is based on a strength of the received signal and a second measure that is indicative of frequency selectivity in the wireless channel, wherein determining the data rate comprises determining channel gain values respectively for two or more different subcarriers associated with the received signal, and determining the second measure based on a combination of the channel gain values to measure the frequency selectivity in the wireless channel across the two or more different subcarriers associated with the received signal, and wherein the first measure serves as a primary determinant of the data rate and the second measure serves as a secondary determinant of the data rate; and transmitting information over the wireless channel in accordance with the data rate.

2. The method of claim 1, wherein determining the data rate comprises:
determining a first data rate based on the first measure; and
determining a second data rate based on the first data rate and the second measure,
wherein transmitting the information comprises transmitting the information over the wireless channel in accordance with the second data rate.

3. The method of claim 2, wherein determining the first data rate comprises selecting the first data rate based on the first measure and one or more signal quality thresholds, wherein determining the second data rate comprises adjusting the first data rate if the first measure falls within a tolerance range of a signal quality threshold and if the second measure indicates an adjustment is needed.

4. The method of claim 1, wherein the wireless channel comprises a radio frequency channel, and the received signal comprises an orthogonal frequency division multiplexed (OFDM) signal corresponding to multiple frequency tones that make up the radio frequency channel.

5. The method of claim 4, further comprising:
estimating channel response characteristics of the frequency tones; and
deriving the second measure from the estimated channel response characteristics of the frequency tones.

6. The method of claim 5, wherein deriving the second measure comprises calculating a frequency selectivity measure for single-in-single-out (SISO) based OFDM wireless communications.

7. The method of claim 5, wherein deriving the second measure comprises calculating a geometric mean of reciprocal noise enhancement factors across the frequency tones.

8. A method, comprising:
operating multiple transmit antennas and multiple receive antennas to transmit and receive data over a wireless channel;
determining a data rate of information transmission over the wireless channel based on two or more measures derived from multiple received signals that are received by the multiple receive antennas, respectively, wherein the two or more measures comprise a first measure that is based on a strength of the multiple received signals and a second measure that is indicative of frequency selectivity in the wireless channel, wherein determining the data rate comprises determining channel gain information respectively for two or more different subcarriers associated with the received signal, and determining the second measure based on a combination of the channel gain information to measure the frequency selectivity in the wireless channel across the two or more different subcarriers associated with the received signals, and wherein the first measure serves as a primary determinant of the data rate and the second measure serves as a secondary determinant of the data rate; and transmitting information over the wireless channel in accordance with the data rate.

9. The method of claim 8, wherein determining the data rate comprises:
determining a first data rate based on the first measure; and
determining a second data rate based on the first data rate and the second measure,
wherein transmitting the information comprises transmitting the information over the wireless channel in accordance with the second data rate.

10. The method of claim 9, wherein determining the first data rate comprises selecting the first data rate based on the first measure and one or more signal quality thresholds, wherein determining the second data rate comprises adjusting the first data rate if the first measure falls within a tolerance range of a signal quality threshold and if the second measure indicates an adjustment is needed.

11. The method of claim 8, wherein the multiple received signals comprise an orthogonal frequency division multiplexed (OFDM) signal corresponding to multiple frequency tones.

12. The method of claim 11, comprising:
estimating channel response characteristics of the frequency tones; and
deriving the second measure from the estimated channel response characteristics of the frequency tones.

13. The method of claim 12, wherein deriving the second measure comprises calculating a geometric mean of reciprocal noise enhancement factors across the frequency tones.

14. The method of claim 12, wherein deriving the second measure comprises calculating a frequency selectivity measure for multiple-in-multiple-out (MIMO) based OFDM wireless communications, wherein the frequency selectivity measure is based on a channel gain matrix having dimensions number-of-receive-antennas by number-of-transmit-antennas.

15. The method of claim 8, wherein determining the channel gain information respectively for the two or more different subcarriers comprises determining channel gain matrices respectively for the two or more different subcarriers, the channel gain matrices each having dimensions number-of-receive-antennas by number-of-transmit-antennas, and wherein the second measure is a frequency selectivity measure that is based on a combination of the channel gain matrices.

16. An apparatus, comprising:
circuitry to receive data via multiple receive antennas and transmit data via multiple transmit antennas over a wireless channel; and
circuitry configured to determine a data rate of information transmission over the wireless channel based on two or more measures derived from multiple received signals that are received by the multiple receive antennas, respectively, to cause transmission of information over the wireless channel in accordance with the data rate, and to determine channel gain information respectively for two or more different subcarriers associated with the received signal,
wherein the two or more measures comprise a first measure that is based on a strength of the multiple received signals and a second measure that is indicative of frequency selectivity in the wireless channel, wherein the second measure is determined based on the channel gain information to measure the frequency selectivity in the wireless channel across the two or more different subcarriers associated with the received signals, and wherein the first measure serves as a primary determinant of the data rate and the second measure serves as a secondary determinant of the data rate.

17. The apparatus of claim 16, wherein the circuitry configured to determine the data rate comprises circuitry to determine a first data rate based on the first measure and to determine a second data rate based on the first data rate and the second measure.

18. The apparatus of claim 17, wherein the circuitry configured to determine the data rate comprises circuitry to select the first data rate based on the first measure and one or more signal quality thresholds and to adjust the first data rate if the first measure falls within a tolerance range of a signal quality threshold and if the second measure indicates an adjustment is needed.

19. The apparatus of claim 16, wherein the multiple received signals comprise an orthogonal frequency division multiplexed (OFDM) signal corresponding to multiple frequency tones, the apparatus comprising:
    circuitry to estimate channel response characteristics of the frequency tones; and
    circuitry to derive the second measure from the estimated channel response characteristics of the frequency tones.

20. The apparatus of claim 19, wherein the circuitry to derive the second measure is configured to calculate a geometric mean of reciprocal noise enhancement factors across the frequency tones.

21. The apparatus of claim 19, wherein the circuitry to derive the second measure is configured to calculate a frequency selectivity measure for multiple-in-multiple-out (MIMO) based OFDM wireless communications, wherein the frequency selectivity measure is based on a channel gain matrix having dimensions number-of-receive-antennas by number-of-transmit-antennas.

22. The apparatus of claim 16, wherein the channel gain information comprises two or more channel gain matrices respectively associated with the two or more different subcarriers, the channel gain matrices each having dimensions number-of-receive-antennas by number-of-transmit-antennas, and wherein the second measure is a frequency selectivity measure that is based on a combination of the channel gain matrices.

* * * * *